United States Patent [19]

Couture

[11] 4,438,546
[45] Mar. 27, 1984

[54] HEAD HOLDING METHOD AND APPARATUS FOR A HIDE PULLER

[75] Inventor: William F. Couture, Amarillo, Tex.

[73] Assignee: Iowa Beef Processors, Inc., Dakota City, Nebr.

[21] Appl. No.: 306,637

[22] Filed: Sep. 28, 1981

[51] Int. Cl.³ .............................................. A22B 5/16
[52] U.S. Cl. .......................................... 17/50; 17/21
[58] Field of Search .................. 17/21, 50, 62, 70, 44, 17/44.3, 1 A

[56] References Cited

U.S. PATENT DOCUMENTS

| | | | |
|---|---|---|---|
| 899,391 | 9/1908 | Farrell | 17/44.3 X |
| 2,696,633 | 12/1954 | Hincks | 17/21 |
| 3,046,597 | 7/1962 | Macy et al. | 17/21 |
| 3,101,508 | 8/1963 | Murphy et al. | 17/1 A X |
| 3,220,051 | 11/1965 | Fill | 17/21 |
| 3,274,639 | 9/1966 | Knauss | 17/21 |
| 3,404,431 | 10/1968 | Knauss | 17/50 |
| 3,599,277 | 8/1971 | Brown | 17/21 |
| 3,789,458 | 2/1974 | Brown | 17/21 |
| 4,164,056 | 8/1979 | Hilgner et al. | 17/21 |
| 4,229,860 | 10/1980 | Irwin | 17/50 |

FOREIGN PATENT DOCUMENTS 1918301 10/1969 Fed. Rep. of Germany .......... 17/21

Primary Examiner—Willie G. Abercrombie
Attorney, Agent, or Firm—Beveridge, DeGrandi and Kline

[57] ABSTRACT

A pair of jaws engage the neck of a hanging freshly slaughtered carcass to deter upward movement of the carcass while the hide is pulled therefrom. The jaws are movable longitudinally in a direction parallel to the direction of carcass movement, vertically for alignment with the necks of different carcasses and laterally from a retracted position to an extended position where the jaws lie on opposite sides of the carcass neck.

24 Claims, 6 Drawing Figures

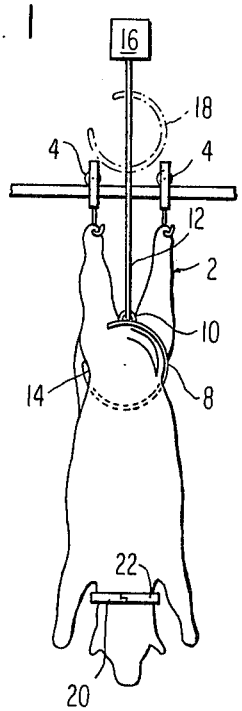
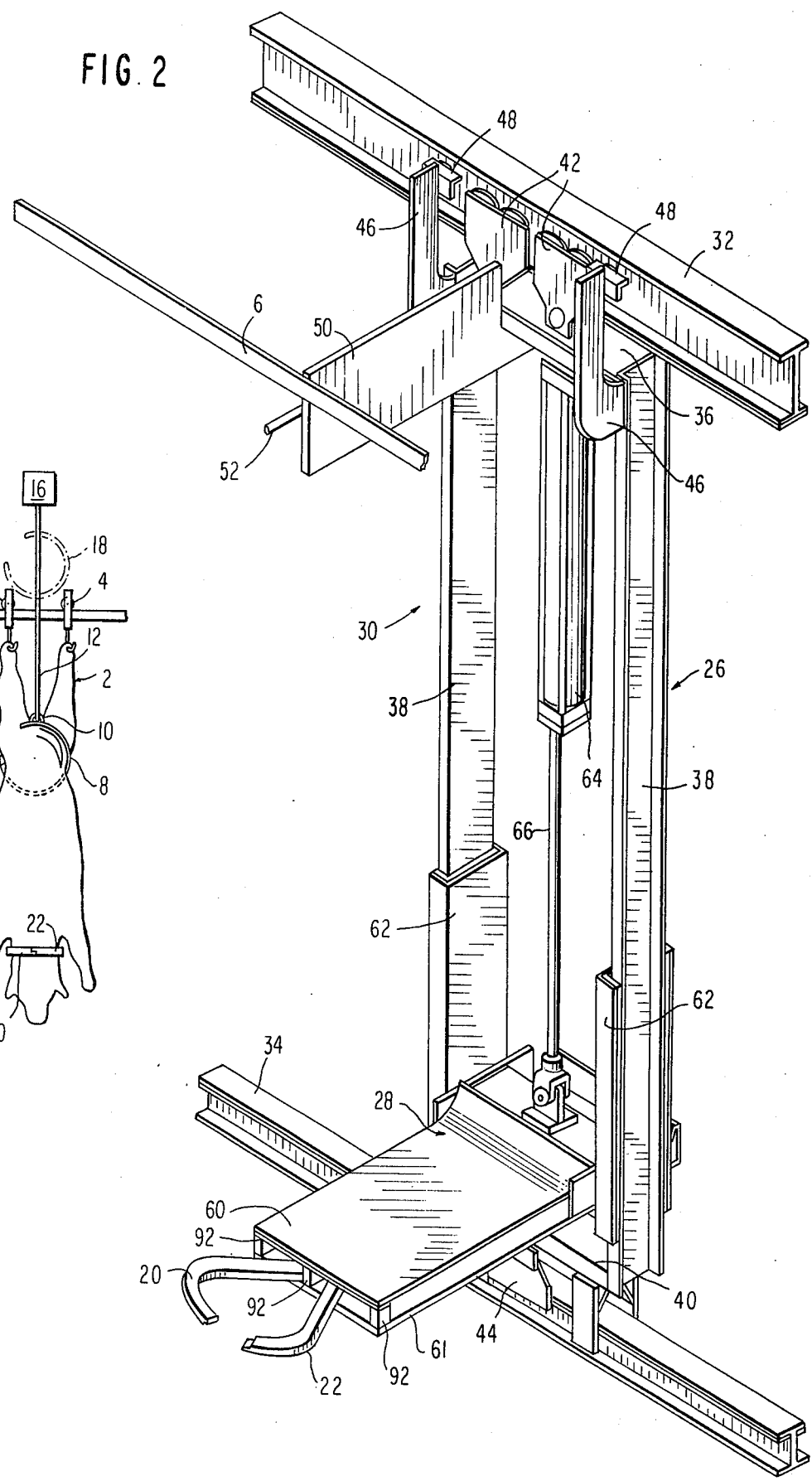

HEAD HOLDING METHOD AND APPARATUS FOR A HIDE PULLER

BACKGROUND OF THE INVENTION

This invention relates to a method and apparatus which is used in conjunction with the pulling of hides from animal carcasses. In particular, it is applicable to most types of hide pulling systems wherein the hide is forceably pulled in a direction which is hindward on the carcass and wherein means are provided for restraining the head of the carcass to resist movement in the direction of the hindward hide-pulling forces. A preferred hide pulling operation of this nature is discovered in U.S. Pat. No. 3,810,277 of May 14, 1974 which is incorporated in its entirety herein by reference.

When hides are pulled upwardly in a hindward direction, it has been customary to deter movement of the carcass head by means of a manually-applied chain wrapped around the neck of the carcass. The lower end of the chain is connected to a trolley which enables it to move with the carcass while the hide is being pulled. This requires additional manpower and it also exposes the worker to possible injury if a carcass falls from the rail.

SUMMARY OF THE INVENTION

By adoption of the present invention, it is possible to reduce the manpower requirements at the hide pulling station without any loss in the effective retention of the carcass head. The apparatus according to the invention holds the head of an animal carcass while the hide thereof is pulled hindwardly by a hide puller. This apparatus comprises a support for the carcass, and a jaw assembly for engaging about the neck of the carcass on the support to deter movement of the head of the carcass when the hide is pulled in a hindward direction. The jaw assembly includes a pair of jaws which are relatively movable between open and closed positions. The jaws in their open positions permit entry thereinto and exit therefrom of the neck of a carcass. In their closed positions, they trap the neck of the carcass therebetween. Actuator means are provided for moving the jaws between open and closed positions.

The method according to the invention is in its broadest respects inherent in the apparatus described in the preceding paragraph. This method of holding down the head of an animal carcass while the hide is pulled hindwardly by a hide puller comprises the steps of supporting the carcass, and engaging the neck of the carcass with a jaw assembly which includes a pair of jaws which are movable from an open position to a closed position. The engaging step is performed by placing the jaws in the open position, positioning the neck of a carcass between the jaws, and moving the jaws with an actuator to a closed position to entrap the neck of a carcass therebetween. The hide of the carcass is pulled in a hindward direction while the jaws deter movement of the carcass head.

In addition to the basic components and steps described above, it is also highly desirable to provide means and steps for moving the jaw assembly vertically, horizontally with the carcass movement, and laterally from a retracted position to an extended position. The retracted position is spaced laterally from the neck of a carcass on the support, and the extended position is located in an area occupied by the neck of a carcass on the support. The vertical movement is desirable because it positions the jaw assembly at a height which corresponds to the height of the neck of the respective carcass.

Numerous other features may be embraced within the inventive concept. For example, the jaws are preferably inclined from the horizontal when they are in their closed and extended position; and, they have a shape which provides therebetween a space which has the general shape of a teardrop when the jaws are in their closed position. It is desirable to provide the jaws with tip portions which are spaced apart when the jaws are open and are in mutually overlapping relation when the jaws are closed. A further desirable feature is to provide pivotal movement of the jaws and a tension bar for obstructing deflective movement of the jaws when the carcass is subjected to hide pulling forces. Such a tension bar is located where it will contact the jaw member between the jaw pivot and the neck-entrapping portion of the jaw.

The invention may further involve the provision of an interlock system which is associated with and movable with the jaw assembly. This involves an interlock member which is engageable with the carcass-supporting trolley so that the jaw-carrying frame is driven forwardly by forward movement of the trolley. Means are provided for retracting the interlock member from the trolley to permit the frame to return to a start position where the apparatus stands ready to receive a subsequent carcass. The interlock member is preferably offset in a forward longitudinal direction from the center of the jaw assembly, whereby the interlock member will index the jaw assembly longitudinally with respect to a carcass on a trolley which contacts the interlock member.

Additional aspects of the invention may be determined from a study of the following description of a preferred embodiment thereof.

BRIEF DESCRIPTION OF THE DRAWINGS

FIG. 1 is a diagramatic view showing the preferred type of hide pulling operation to which the present invention is applicable;

FIG. 2 is a perspective view of a preferred apparatus embodying the present invention;

DESCRIPTION OF A PREFERRED EMBODIMENT

Figure 3:
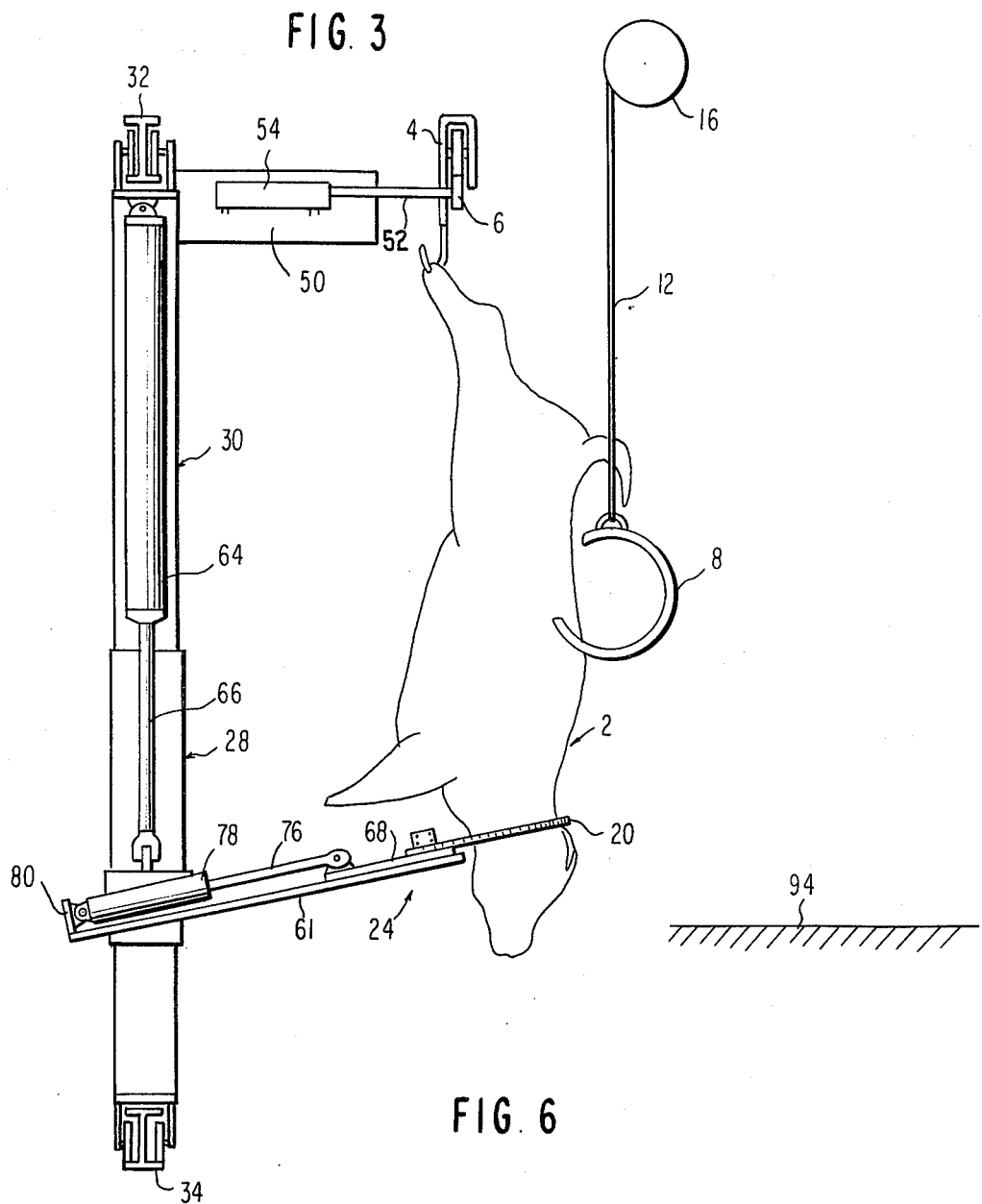
FIG. 3 is an elevational view as seen longitudinally along the path of carcass movement.

Although the invention is suitable for use with a variety of hide pulling machines, it has proven to be particularly well adapted to the hide pulling system disclosed in U.S. Pat. No. 3,810,277 issued May 14, 1974. In this procedure which is shown in FIG. 1, a carcass 2 is supported by trolleys 4 on a rail 6. Preliminarily, the sides of the hide are pulled from the carcass and a passage is made at the midportion of the back to separate the hide from the flesh. Then, as shown in FIG. 1, a rigid loop 8 is inserted between the hide and the midportion of the back. The loop 8 has an eye 10 connected to a cable 12 which, in turn, is connected to a pulling device such as a winch 16. The pulling device 16 is operated to pull cable 12 and loop 8 upwardly to separate the hindward portions of the hide from the carcass. The upper position of the loop is shown in broken lines at 18. Subsequently, the hide is pulled downwardly to separate it from the forward portions of the carcass.

During the upward pulling operation, there is a tendency for the forces to lift the carcass. If these lifting forces were unopposed, the hide pulling operation would be impeded and a risk would be created that the carcass would fall from the rail. To avert this, it has been customary to apply manually a holddown chain to the carcass neck prior to the uppulling operation. This chain has been connected to a lower trolley which enables it to move longitudinally with the carcass. After the uppulling operation, the chain is disconnected in preparation for the over-the-head downpulling step.

According to the present invention, the neck is engaged by a pair of rigid jaws 20 and 22 which are shown only diagramatically in FIG. 1 and are shown in greater detail in FIGS. 2-5.

The jaws 20 and 22 are supported so that, in addition to their normal opening and closing movement, they are capable of moving vertically, laterally relative to the path of carcass movement, and longitudinally parallel to the path of carcass movement. Lateral mobility of the jaws is provided by a retractor assembly 24 shown best in FIG. 4. Longitudinally, mobility is provided by an upright frame assembly 26 shown in FIG. 2; and, vertical movement is provided by a base plate carriage 28 which is shown in FIGS. 2 and 3.

Referring to FIG. 2, it will be seen that the apparatus is supported for longitudinal movement on a frame 30 which rides on an upper track 32 and a lower track 34 which lie parallel to the beef rail 6. This upstanding rectangular frame 30 is formed of an upper member 36, side members 38 and a bottom member 40. Trolley assemblies 42 on the upper member 36 ride on the upper track 32; and, trolleys 44 on the lower end of the frame ride on the lower track 34. To deter any lateral or twisting movement of the frame 30, it is provided with outriggers 46 with stabilizing wheel assemblies 48 which bear against the web of the upper track 32.

To provide proper side-by-side alignment between the carcass 2 and the jaws 20 and 22, the frame is provided with a protruding plate 50 which has an indexing or interlock pin 52 extending therefrom. As shown in FIG. 3, this interlock pin 52 is located in the path of a trolley 4 so that the frame 30 will be driven forwardly by forward movement of the trolley. The interlock pin is offset in a forward longitudinal direction from the center of the jaw assembly. The distance of this offset is such that the interlock member will index the jaw assembly longitudinally with respect to a carcass on a leading trolley which contacts the interlock member.

The interlock pin is operated by the piston rod of a hydraulic cylinder 54 shown in FIG. 3. The cylinder is operable to extend the pin 52 to the position illustrated in FIG. 3, and to retract the pin 52 from the path of the trolley 4. When pin 52 is retracted, the frame 30 is able to return to a start position where the apparatus stands ready to process a subsequent carcass at the hide puller.

As mentioned above, vertical movement of the neck-engaging jaws 20 and 22 is provided by the vertically movable base plate carriage assembly 28 which is best shown in FIG. 2. This assembly includes a housing 60 which is rigidly affixed to a pair of vertical channels 62. A base plate 61 comprises the lower wall of the housing.

The channels 62 are engaged with and vertically movable along the side members 38 of the frame assembly. Such vertical movement is produced by an hydraulic cylinder 64 which is connected by a clevis to the upper member 36 of the frame 30. The rod 66 of cylinder 64 is connected by a clevis to the housing 60. The disposition of these components is such that the cylinder 64 is capable of moving the jaw assembly vertically within a range of heights which correspond to the elevations of necks of different carcasses on the rail 6. The hydraulic cylinder 64 is operable so that the base plate carriage assembly 28 and the jaws 20 and 22 supported thereby are vertically immovable during the hide pulling step depicted in FIG. 1.

Figure 4:
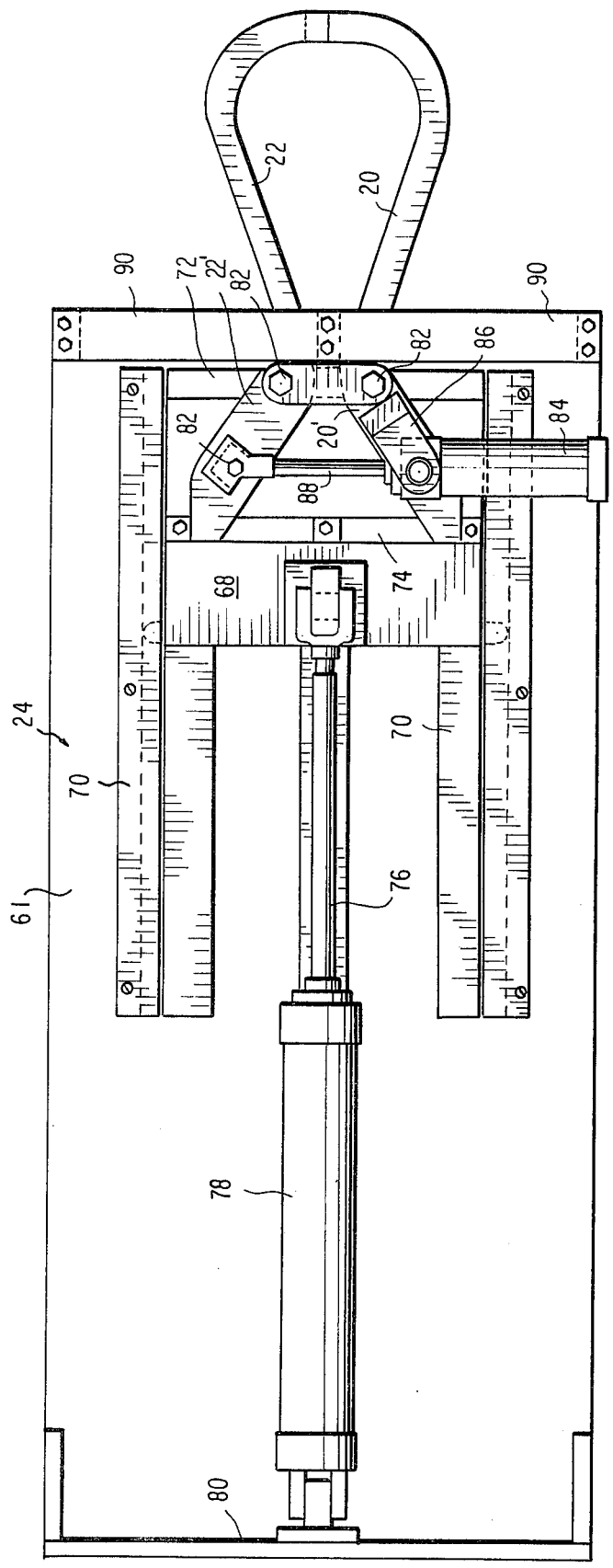
FIG. 4 is a plan view which shows the jaw actuating and retraction mechanisms.
Figure 5:
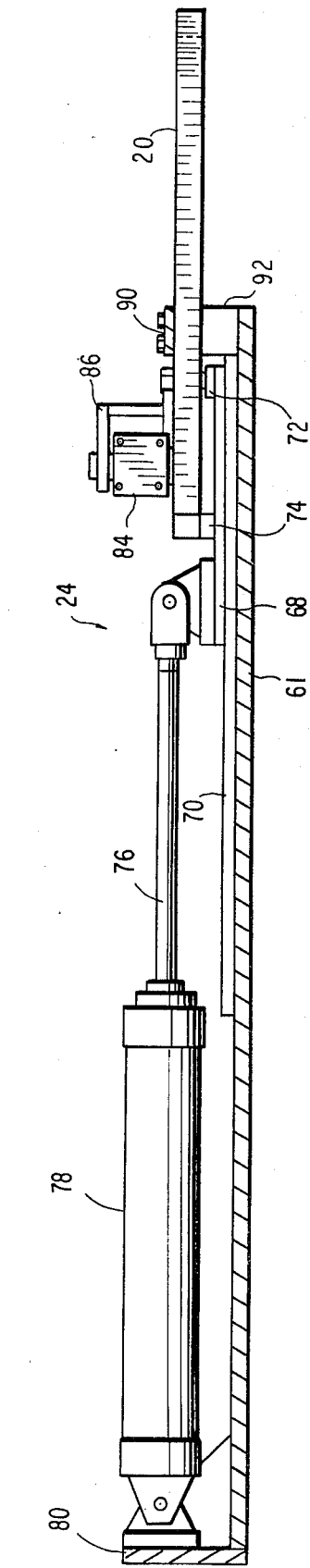
FIG. 5 is a partially sectioned elevational view corresponding to FIG. 4.

The neck-engaging jaws 20 and 22 are laterally extended from and retracted into the housing 60 by a retractor assembly 24 which is shown in FIGS. 3, 4 and 5. Referring to the somewhat diagramatic illustration of FIG. 3, it will be seen that the retractor assembly includes a laterally movable slider plate 68 which is supported and guided for linear sliding movement on the base plate 61. As shown in FIG. 4, the slider plate 68 is supported by a pair of guide tracks 70 which are mounted on the base plate 61. The guide tracks 70 have inwardly facing guide slots which extend lengthwise thereof, and the slider plate 68 is provided with tabs which project into these slots to assure proper guiding movement. Bars 72 and 74 are provided on the slider plate 68 to support the lever ends of the jaw members as will be described below.

At its forward end, the slider plate 68 is connected to and supports the jaws 20 and 22. At its rear end, the slider plate 68 is connected to a clevis on the rod 76 of hydraulic cylinder 78. The cylinder 78 is attached by a clevis to the rear wall 80 of the housing 70. When the cylinder 78 is operated to retract the rod 76, the slider plate 68 moves the jaws 20 and 22 to a retracted position which is inside housing 60 and is spaced laterally from the carcass neck. Extension of the rod 76 by cylinder 78 moves the jaws into the area occupied by the carcass neck as shown in FIGS. 2 and 3.

The jaws 20 and 22 are best shown in FIG. 4 wherein it will be seen that each jaw is an integral member which includes an outer arcuate neck-engaging portion and an inner lever portion. The outer portions, i.e. the portions which project from the housing 60 when the slider plate 68 is in its extended position, are shaped to provide therebetween a space which has the general shape of a teardrop when the jaws are in their closed positions. The tip portions of the jaws are notched as shown in FIG. 2 so that they are in mutually overlapping relation when the jaws are closed.

The orientation of the jaws relative to a horizontal plane is of some significance. Referring to FIG. 3, it will be observed that the extended jaws, closed around the animal neck, are inclined from the horizontal. This particular orientation makes it possible for the jaws to engage above the crown of the head and below the jaw to avoid possible crushing the jaw of the animal. The inclination is preferably between about 5 and 15 degrees from the horizontal. To permit fine tuning of the angle, the base plate 61 may be connected to the channels 62 by bolts which ride in arcuate slots and may be tightened at an appropriate angle.

The jaws are pivotally supported by a loose fit on bronze flange bearings on shoulder bolts 82. The bolts 82 are threaded into the bar 72 of the slider plate. Relative pivotal movement of the jaws is produced by an hydraulic jaw actuator cylinder 84. The cylinder 84 moves the jaws between open and closed positions. At their open position, the neck of a carcass may enter and exit the area between the jaws; and, in the closed position, the neck of the carcass is entrapped between the jaws, preferably with the tips thereof in contact with each other.

The cylinder 84 carries a lower trunnion which is pivotally received by a bore in the lever portion 20' of jaw 20. An upper trunnion on the cylinder 84 is received in the bore of a retainer strap 86 affixed to the lever portion 20' as shown in FIG. 5. The cylinder 84 has a rod 88 which is pivotally connected to the lever portion 22' of the jaw member 22.

It is desirable to provide a supporting mechanism which is capable of sustaining the substantial forces imposed on the cantilevered neck-engaging portions of the jaws 20 and 22. This function is performed by slidably engaging the rear ends of the lever portions 20' and 22' with the bar 74 of the slider plate 68; and, by providing a tension bar 90 shown in FIGS. 4 and 5 for resisting upward movement of the jaws between the pivot bolts 82 and the neck-engaging portions of the jaws. The tension bar 90 is affixed to the base plate 61 by bolts and spacers, one of the latter being shown at 92 in FIG. 5.

Conventional electrohydraulic and electropneumatic controls are provided for the double acting cylinders 54, 64, 78 and 84 so that an operator, standing at a control panel on a platform 94 shown in FIG. 3 will be able to depress buttons to actuate the cylinders.

Figure 6:
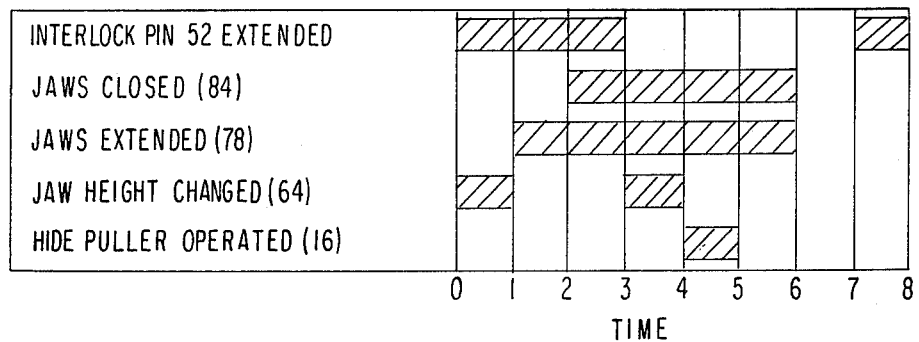
FIG. 6 is a time diagram, not drawn to scale, showing a preferred sequence of operations.

In operation, the apparatus is initially at a start position on the tracks 32 and 34. The cylinders 78 and 84 are positioned so that the jaws 20 and 22 are open and are retracted within the housing 60. At time T0 shown in FIG. 6, the elevating cylinder 64 is operated to move the base plate carriage 28 to a height so that the jaws are at the elevation of the neck of a carcass advancing toward the apparatus. The carcass, supported by trolleys 4 on the guide rail 6, is driven forwardly by a drive chain. This brings the trolley into contact with the indexing or interlock pin 52 on the upright jaw-supporting frame 30 so that the frame will automatically commence movement at the trolley speed with the jaws in side-by-side alignment with the neck of the carcass.

The operator at time T1 depresses the "extend" button, thereby actuating the cylinder 78 to move the open jaws to a position where they lie on opposite sides of the carcass neck. The operator then, at T2, depresses the "jaw close" button to operate the cylinder 84 to move the jaws 20 and 22 to their closed neck-engaging position. Next, the operator momentarily depresses the "down" button to actuate the cylinder 64 and move the jaws 20 and 22 against the crown of the carcass head. If the animal has an extremely small head, cylinder 78 may be retracted slightly to secure the head against the outer edge of the base plate 61, thereby effectively reducing the size of the neck-engaging opening of the jaws. The hide-pulling loop 8 is inserted between the hide and the midportion of the back, and the mechanism 16 is operated to pull the loop 8 upwardly to the position shown at broken lines 18 in FIG. 1. The force of the loop 8 tending to lift the carcass is resisted by the jaws and their associated supporting structure. When the uppulling operation is completed, the operator simultaneously depresses the "open jaws" and "retract jaws" buttons so that the cylinders 78 and 84 are operated to open the jaws and to retract them into the housing 60.

Another step performed by the operator is to depress the "interlock release" button which actuates the cylinder 54 to withdraw the interlock or indexer pin 52. Preferably, this is done shortly after depressing the "jaw close" button because, at this point, the jaws and frame will inherently be carried in a forward longitudinal direction by the forwardly driven carcass. At the conclusion of the hide pulling operation, after the jaws have been opened and retracted, the interlock pin, being in a retracted position, will not interfere with the return movement of the assembly to its start position where the apparatus is ready to engage the neck of a subsequent carcass.

The foregoing description relates to a preferred embodiment of the invention. It is susceptible to many modifications and may take many alternative forms. Therefore, it is emphasized that the invention, rather than being limited to the disclosed system, is embracing of a wide variety of apparatuses and methods which fall within the spirit of the following claims.

I claim:

1. Apparatus for holding the head of an animal carcass while the hide of the carcass is pulled hindwardly of the carcass by a hide puller, comprising,
   a support for a carcass,
   a jaw assembly for engaging about the neck of a carcass on the support to deter movement of the head of the carcass when the hide of the carcass is pulled in a hindward direction, said jaw assembly including a pair of jaws which are relatively movable from an open position to a closed position at which the neck of a carcass is entrapped therebetween, said jaws while in said open position permitting the entry thereinto and exit therefrom of the neck of a carcass,
   jaw actuator means for moving the jaws between said open and closed positions,
   means for moving the jaw assembly from a retracted position to an extended position, said retracted position being spaced laterally from the neck of a carcass on said support, said extended position being located in an area occupied by the neck of a carcass on said support,
   said jaws being inclined from the horizontal when they are in their closed and extended position,
   means for moving the jaw assembly vertically to correspond to the heights of the necks of different carcasses on said support,
   said support including a horizontal rail and trolleys which are movable along said rail, said jaw assembly being movable in a direction which is generally parallel to said rail.

2. The apparatus of claim 1 including means adjacent to the jaw assembly for pulling hindwardly on the hide of a carcass on said support.

3. The apparatus of claim 1 or claim 2 wherein the jaws are shaped to provide therebetween a space which has the general shape of a teardrop when the jaws are in their closed position.

4. The apparatus of claim 1 or claim 2 wherein the jaws have tip portions which are spaced apart when the jaws are in their open position, said tip portions being in mutually overlapping relation when the jaws are in their closed position.

5. The apparatus of claim 1 or claim 2 having pivot means supporting at least one of the jaws for pivotal movement thereabout, and a tension bar contacting the jaw at a location between the pivot means and the neck-entrapping portion of the jaw, said tension bar being positioned to obstruct deflective movement of the jaw when the carcass is subjected to hide pulling forces.

6. The apparatus of claim 1 or claim 2 including a frame which is movable in a direction which is generally parallel to the rail, said jaw assembly being supported on the frame, said frame being provided with an interlock member which is engageable with the trolley so that the frame is driven forwardly by forward movement of the trolley.

7. The apparatus of claim 6 wherein means are provided for retracting the interlock member from the trolley to permit the frame to return to a start position where the apparatus stands ready to receive a subsequent carcass.

8. The apparatus of claim 6 wherein the interlock member is offset in a forward longitudinal direction from the center of the jaw assembly, whereby said interlock member will index the jaw assembly longitudinally with respect to a carcass on a trolley which contacts the interlock member.

9. Apparatus for holding the head of an animal carcass while the hide of the carcass is pulled hindwardly of the carcass by a hide puller, comprising,
   a support for a carcass,
   a jaw assembly for engaging about the neck of a carcass on the support to deter movement of the head of the carcass when the hide of the carcass is pulled in a hindward direction, said jaw assembly including a pair of jaws which are relatively movable from an open position to a closed position at which the neck of a carcass is entrapped therebetween, said jaws while in said open position permitting the entry thereinto and exit therefrom of the neck of a carcass,
   jaw actuator means for moving the jaws between said open and closed positions,
   means for moving the jaw assembly from a retracted position to an extended position, said retracted position being spaced laterally from the neck of a carcass on said support, said extended position being located in an area occupied by the neck of a carcass on said support, and
   means for moving the jaw assembly vertically to correspond to the heights of the necks of different carcasses on said support.

10. The apparatus of claim 9 including means adjacent to the jaw assembly for pulling hindwardly on the hide of a carcass on said support.

11. The apparatus of claim 9 or claim 10 wherein the jaws have tip portions which are spaced apart when the jaws are in their open position, said tip portions being in mutually overlapping relation when the jaws are in their closed position.

12. The apparatus of claim 9 or claim 10 having pivot means supporting at least one of the jaws for pivotal movement thereabout, and a tension bar contacting the jaw at a location between the pivot means and the neck-entrapping portion of the jaw, said tension bar being positioned to obstruct deflective movement of the jaw when the carcass is subjected to hide pulling forces.

13. The apparatus of claim 9 or claim 10 wherein the jaws are inclined from the horizontal when they are in their closed position.

14. The apparatus of claim 9 or claim 10 wherein the jaws are shaped to provide therebetween a space which has the general shape of a teardrop when the jaws are in their closed position.

15. The apparatus of claim 9 or claim 10 wherein the support includes a horizontal rail and trolleys which are movable along said rail, said jaw assembly being movable in a direction which is generally parallel to said rail.

16. Apparatus for holding the head of an animal carcass while the hide of the carcass is pulled hindwardly of the carcass by a hide puller, comprising,
    a support for a carcass, said support including a horizontal rail and trolleys which are movable along said rail,
    a frame which is movable in a direction which is generally parallel to the rail,
    a jaw assembly for engaging about the neck of a carcass on the support to deter movement of the head of the carcass when the hide of the carcass is pulled in a hindward direction, said jaw assembly being supported on the frame for movement in a direction which is generally parallel to said rail, said jaw assembly including a pair of jaws which are relatively movable from an open position to a closed position at which the neck of a carcass is entrapped therebetween, said jaws while in said open position permitting the entry thereinto and exit therefrom of the neck of a carcass,
    jaw actuator means for moving the jaws between said open and closed positions,
    said frame being provided with an interlock member which is engageable with the trolley so that the frame is driven forwardly by forward movement of the trolley.

17. The apparatus of claim 16 wherein means are provided for retracting the interlock member from the trolley to permit the frame to return to a start position where the apparatus stands ready to receive a subsequent carcass.

18. The apparatus of claim 17 wherein the interlock member is offset in a forward longitudinal direction from the center of the jaw assembly, whereby said interlock member will index the jaw assembly longitudinally with respect to a carcass on a trolley which contacts the interlock member.

19. A method of holding down the head of an animal carcass while the hide of the carcass is pulled hindwardly of the carcass by a hide puller, comprising the steps of,
    supporting the carcass,
    moving the carcass on trolleys on a horizontal rail,
    engaging the neck of a carcass on the support with a jaw assembly which includes a pair of jaws which are movable from an open position to a closed position,
    said engaging step being performed by placing said jaws in said open position, positioning the neck of a carcass between said jaws, and moving said jaws with an actuator to a closed position to entrap the neck of a carcass therebetween,
    moving said jaw assembly in a direction which is generally parallel to said rail, said step of moving the jaw assembly being performed by engaging the trolley with an interlock member which is connected to the jaw assembly so that the jaw assembly is driven forwardly by forward movement of the trolley, and
    pulling the hide of the carcass in a hindward direction while said jaws deter movement of the head of the carcass.

20. The method of claim 19 including the step of disengaging the interlock member from the trolley and thereafter returning the jaw assembly to a start position where the apparatus stands ready to receive a subsequent carcass.

21. The method of claim 19 wherein the interlock member is offset in a forward longitudinal direction from the center of the jaw assembly, said interlock member being operable to index the jaw assembly longitudinally with respect to a carcass on a trolley which contacts the interlock member.

22. A method of holding down the head of an animal carcass while the hide of the carcass is pulled hindwardly of the carcass by a hide puller, comprising the steps of, supporting the carcass, moving a jaw assembly vertically to correspond to the height of a neck of a carcass on said support, said jaw assembly including a pair of jaws which are movable from an open position to a closed position, engaging the neck of a carcass on the support with said jaw assembly, said engaging step being performed by placing said jaws in an open position, positioning the neck of the carcass between said jaws by moving the jaw assembly from a retracted position to an extended position, said retracted position being spaced laterally from the neck of a carcass on said support, said extended position being located in an area occupied by the neck of a carcass on said support, and moving said jaws with an actuator to a closed position to entrap the neck of a carcass therebetween, and pulling the hide of the carcass in a hindward direction while said jaws deter movement of the head of the carcass.

23. The method of claim 22 wherein the jaws when in their closed position are inclined from the horizontal.

24. The method of claim 22 including the steps of moving the carcass on trolleys on a horizontal rail, and moving said jaw assembly in a direction which is generally parallel to said rail.

* * * * *